United States Patent [19]

Teachout, Sr.

[11] 4,229,924
[45] Oct. 28, 1980

[54] GRIPPING DEVICE AND METHOD

[76] Inventor: Donald O. Teachout, Sr., 1721 Bradford, N.E., Grand Rapids, Mich. 49503

[21] Appl. No.: 896,250

[22] Filed: May 24, 1978

[51] Int. Cl.³ .......................................... B65B 13/02
[52] U.S. Cl. .................................. 53/399; 24/16 R; 81/427
[58] Field of Search ............. 81/427; 24/73 A, 16 PB, 24/16 R, 17 A, 17 B, 252 A, 137 R, 30.5 P, 30.5 R, 128 R, 129 D, 206 A; 53/399, 282, 592; 269/254 R; 30/245, 252; 132/44, 46 R, 48 R

[56] References Cited

U.S. PATENT DOCUMENTS

| 1,945,932 | 2/1934 | Caley | 24/16 PB |
| 2,642,766 | 6/1953 | Elsberg | 29/270 |
| 3,197,830 | 8/1965 | Hoadley | 24/16 PB |
| 3,997,943 | 12/1976 | Jones et al. | 24/16 PB |
| 4,112,988 | 9/1978 | Nelson | 24/16 PB |

FOREIGN PATENT DOCUMENTS

| 27169 | of 1898 | United Kingdom | 24/16 PB |
| 227423 | 5/1969 | U.S.S.R. | 24/16 PB |

Primary Examiner—James L. Jones, Jr.
Attorney, Agent, or Firm—Price, Heneveld, Huizenga & Cooper

[57] ABSTRACT

The specification discloses a gripping device and method for using it. The gripping device is an elongated flat strip of flexible, elastic material having at least 100 to 300% elasticity and having an enlargement at one end and a slot at the other whereby the strip can be wrapped around objects, easily stretched as it is wrapped so as to tighten it thereagainst, and secured by slipping the enlargement through the slot.

33 Claims, 11 Drawing Figures

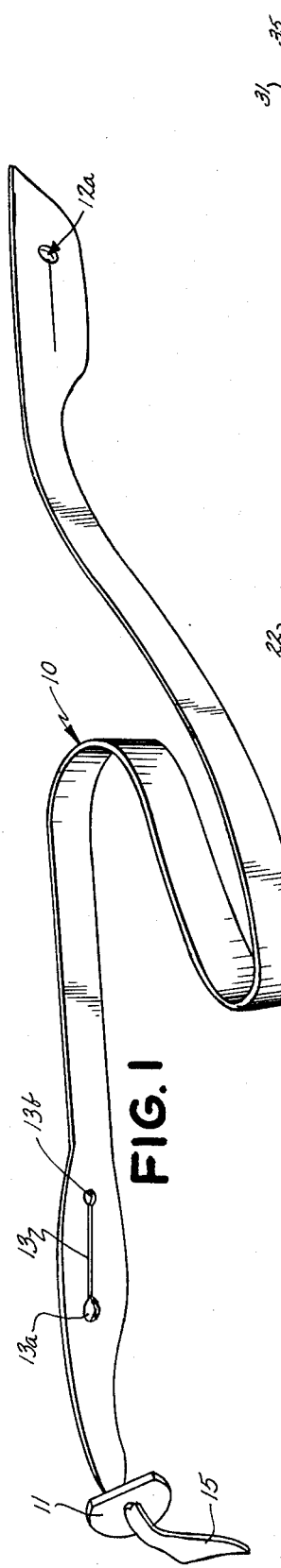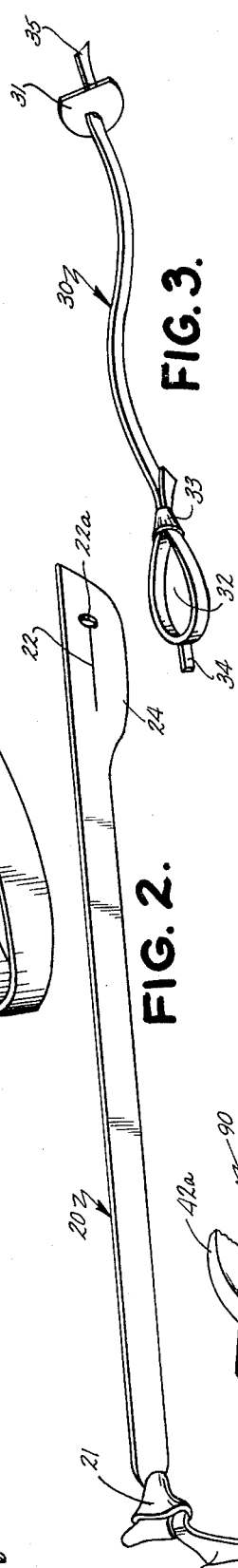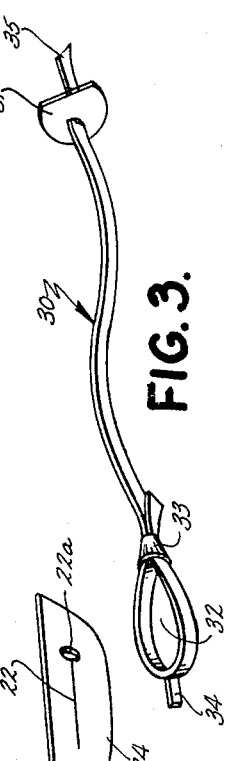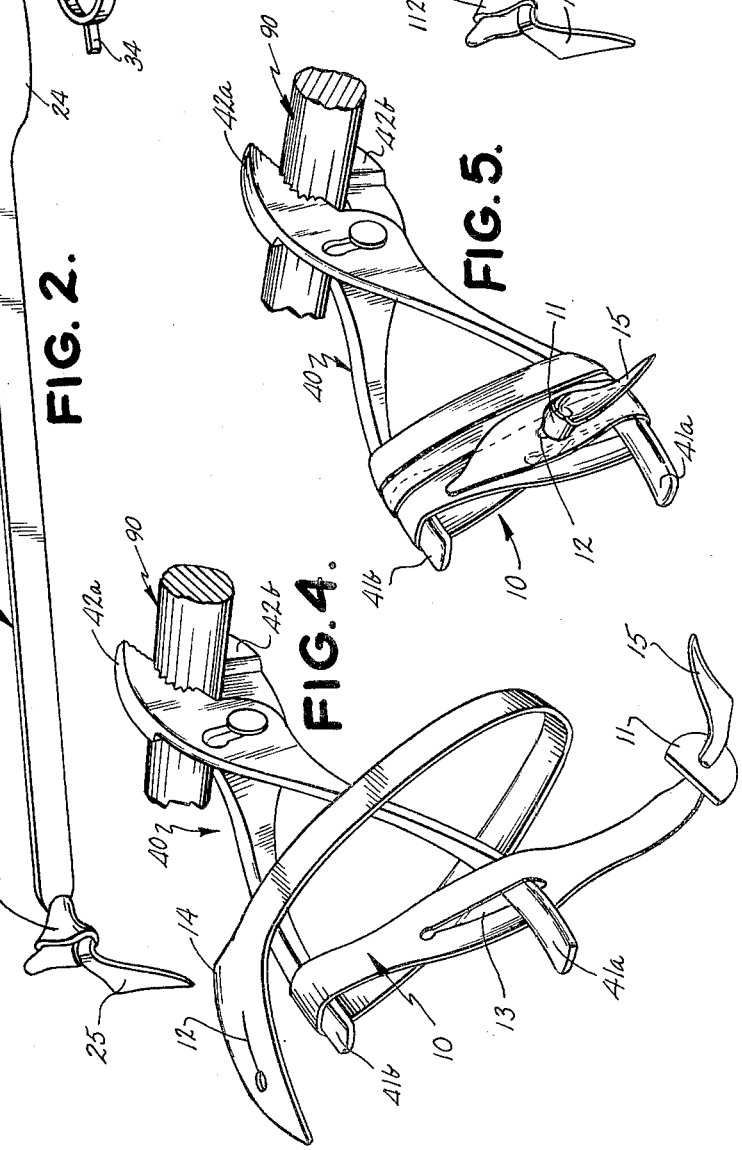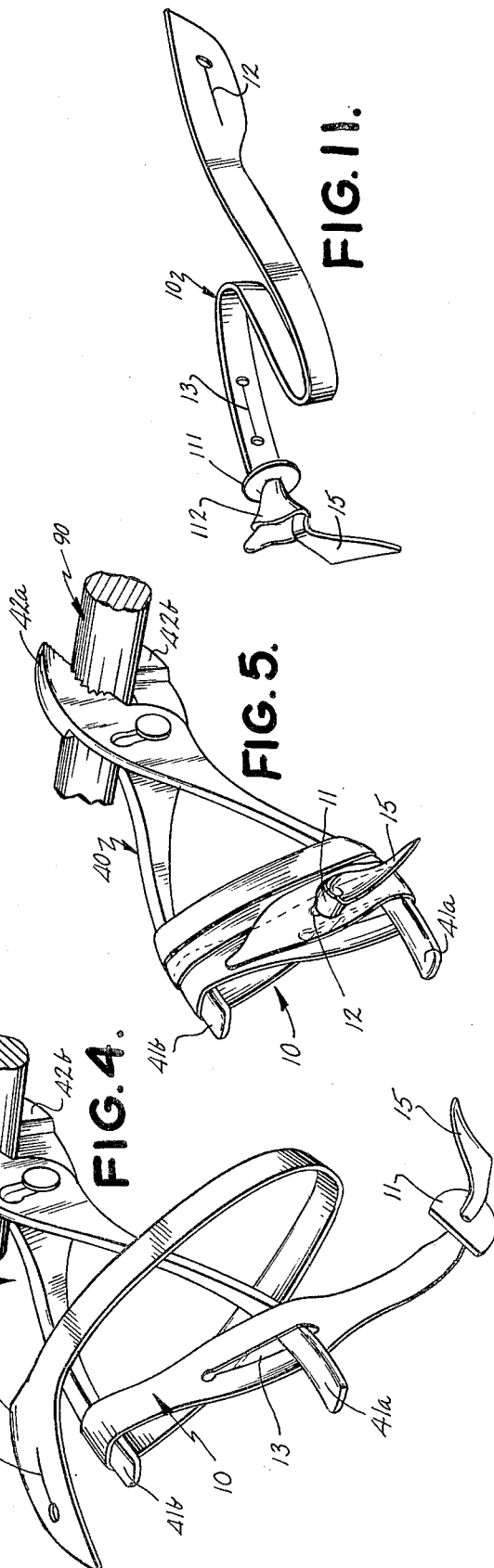

GRIPPING DEVICE AND METHOD

BACKGROUND OF THE INVENTION

The present invention relates to a gripping device and method for using same. The device can be used for tightly securing diverse objects together, to enhance the operability of gripping tools, to facilitate the removal of jar lids, to clamp one member to another and in many other similar applications.

Prior artisans have heretofore developed banding devices for banding around an object or for banding one object to another. Bands for securing the open end of a trash bag are examples of such devices. Another example might be a metallic band wrapped around a conduit in order to clamp it to another conduit, wherein some sort of progressive tightening device is used to pull the ends of the bands in opposite directions to secure a tight fit.

In the use of all such devices, one has to exert a great deal of force in order to pull the ends of the bands in opposite directions to insure a tight fit. Often, the plastic material or metal material of which such bands are made actually breaks before one has achieved satisfactory tightening.

SUMMARY OF THE INVENTION

The present invention not only constitutes a significant improvement on banding devices generally, but actually expands the different applications for which devices of such a general nature can be used. The present invention is more than a banding device, its actually a gripping device.

The gripping device of the present invention comprises an elongated flat strip of flexible, elastic material having at least 100% elasticity such that as it is wrapped around an object, it can be easily stretched so as to tighten against the object very securely. It includes an enlargement at one end and an aperture at the other so that when it is completely wrapped around an object or objects, the enlargement can be inserted through the aperture and will thereby tend to hold the two ends of the device together.

The uses for such a gripping device are legion. Instead of just banding objects together, one can tightly clamp them together. One can wrap the device of the present invention about the lid of a jar to create a very tight wrap thereabout, and then can grasp and rotate the device which encircles the lid, and the lid will loosen much easier. One can employ the gripping device to create a strong grip on the handle ends of a gripping tool such as a pair of pliers, thus freeing the hands.

These and other objects, advantages and features of the present invention will be more fully understood and appreciated by reference to the written specification and appended drawings.

BRIEF DESCRIPTION OF THE DRAWINGS

FIG. 1 discloses a generally perspective view of a gripping device made in accordance with the present invention;

FIG. 2 discloses an alternative embodiment gripping device;

FIG. 3 discloses yet another alternative embodiment gripping device;

FIG. 4 discloses the FIG. 1 gripping device as it is being wrapped around the handle end of a pair of pliers;

FIG. 5 shows the arrangement of the gripping device on a pair of pliers after the ends have been secured;

FIG. 11 is an alternative embodiment in which the enlargement at one end comprises a washer slipped over the gripping device and held in place by a knot tied therein.

DESCRIPTION OF THE PREFERRED EMBODIMENT

Figure 6:
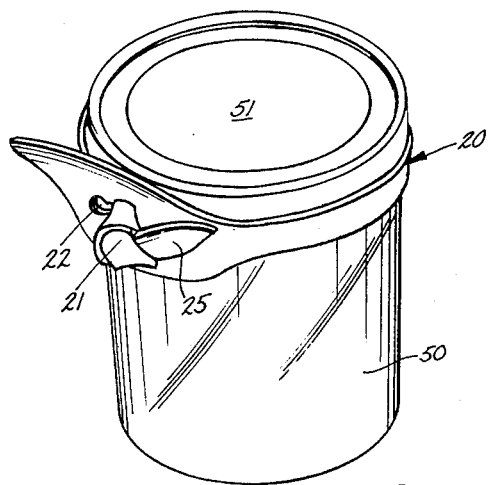
FIG. 6 shows the gripping device wrapped around the lid of a jar.

The preferred embodiment gripping device 10 comprises an elongated strip of flexible, elastic material such as rubber of the type used in truck tire inner tubes. Neoprene rubber or some other rubber less subject to sunlight degradation or solvent attack could also be used and would be preferred in some applications. Strip 10 is approximately ½ inch wide and approximately 1/16-⅛ inch thick. At these dimensions, it has an elasticity of approximately 300%.

The elasticity of the strip is a very important aspect of the invention since it facilitates the gripping action which is illustrated in FIGS. 4 through 10. The strip should have a length and thickness and should be made of such a material that it has an elasticity of at least 100%. By this it is meant that one can stretch the strip until it is at least double its original length. It is most preferable that the elasticity be at least about 250%. If the strip is more elastic, it is easier to build up gripping tension on the object being wrapped as one wraps the strip about it. It has been found that by keeping a moderate tension on strip 10 as one wraps it, the cumulative effect of such tension achieved by making repeated wraps around an object is to create an extremely tight wrap.

Strip 10 has an enlargement 11 near one end which can be molded somewhat in the shape of a button. This can be integrally molded or can be a separately molded button or metal washer 111 slipped over the strip with a knot 112 tied behind it to hold it in place (compare FIGS. 1 and 11). Button 11 includes a generally flat surface which faces away from the nearest end of said strip so that it will hold better when fastened in narrow slot 12 which is located near the other end. Slot 12 is sufficiently long that one can readily push button 11 through it. Yet, slot 12 is extremely narrow, such that it is difficult to pull button 11 back out through it unintentionally. This means that when slot 12 is under tension, the button 11 would normally not come undone when strip 10 is wrapped around something, until such a time as one would want to remove it.

Slot 12 includes a small hole 12a at one end thereof which facilitates opening slot 12 to push button 11 therethrough. Also, hole 12a makes it easier to visibly locate slot 12 as one is looking along the length of strip 10. Most importantly, hole 12a improves stress distribution and prevents the rubber from slitting or tearing further in use.

There is a small portion of strip 10 extending beyond enlargement 11 to define a gripping tab 15 which is pointed. This makes it easier to insert enlargement 11 in hole 12a and also makes it easier to unfasten enlargement 11 by providing a gripping surface.

Strip 10 also has an enlarged width at 14, i.e., in the area of slot 12. This helps to insure the strength of strip 10 at slot 12 in spite of the presence of the slot. Also, the enlarged area 14 is easier to grasp and handle during the use of gripping strip 10.

Gripping strip 10 also has a second slot 13 having enlarged holes 13a and 13b at either end thereof. Holes 13a and 13b serve the function of hole 12a. Slot 13 is dimensioned in the same way as slot 12, but is located at a point spaced from slot 12 and nearer to that end of strip 10 at which button 11 is located.

The second slot 13 increases the versatility of gripping device 10 in two ways. It can be slipped over an object such as the end of one of the handles of a pair of pliers to hold one end of strip 10 in place while one simultaneously tensions and wraps strip 10 about both handles (see FIGS. 4 and 5). Also it can be used to secure itself to a cord or other like object so that it will not be misplaced even when button 11 is not secured in slot 12 (see FIGS. 9 and 10 which shows a slightly smaller version 10a of strip 10).

FIG. 2 discloses alternative embodiment gripping strip 20 which is very similar to strip 10 except that it varies in length and width, as can be done over a wide range of lengths, widths and thicknesses. Strip 20 includes a knot 21 at one end in place of button 11, and a slot 22 at the other end. There is also a pointed gripping tab 25 like tab 15. Slot 22 is comparable in every way to slot 12 and includes a small hole 22a at one end thereof. Strip 20 also includes an enlargement 24 at that end at which slot 22 is located. Strip 20 is made of the same rubber material as strip 10, but is approximately ¼ inch wide through most of its length. As with strip 10, it is only 1/16-⅛ of an inch thick. It has an elasticity of approximately 250%. By ignoring and not using slot 13 in strip 10, one would use strips 10 and 20 in exactly the same manner and for many of the same applications.

FIG. 3 discloses yet another alternative embodiment gripping strip 30 in which the enlargement at one end comprises a bead 31. There is also a small, pointed gripping tab 35. Instead of there being a slot at the other end, the aperture through which bead 31 is inserted is a loop 32. Bead 31 comprises a small quantity of metalized epoxy which has been poured onto the end of strip 30 and allowed to harden. This bead 31 could be of molded rubber as button 11. At the other end of strip 30, loop 32 is closed by first forming the loop and then pouring metalized epoxy on the base of the loop to create a band 33 which, when the metalized epoxy dries, holds loop 32 closed. A small tab 34 projects from the end of loop 32 to make it easier to grip when unfastening enlargement 31. The loop 32 could also be made of molded rubber or Neoprene.

Alternative embodiment gripping strip 30 is designed for lighter applications than either strip 10 or 20. It is made out of a less rigorous rubber, of the type typically used in rubber bands, and is only about ⅛ of an inch wide and a little less than 1/16 of an inch thick. It has an elasticity of approximately 300%.

FIGS. 4 through 10 illustrate various applications of the gripping device of the present invention and of the method for using same. An illustration of this utility is offered by the method for providing strong gripping pressure on a gripping tool, which also forms another aspect of this invention (FIGS. 4 and 5). Referring to FIG. 4, slot 13 has been slipped over one handle 41a of a pair of pliers 40. The jaws 42a and 42b of pliers 40 are clamped about a pipe 90 or the like. The user would then wrap strip 10 around handles 41a and 41b in the manner shown in FIG. 4. Simultaneously, he would be applying tension by pulling on that end of strip 10 at which slot 12 and enlargement 11 are located.

As the wrap is completed, knot 11 is slipped through slot 12 in the manner illustrated in FIG. 5, or slot 12 can be slipped over the end of one of the handles. At this point, the gripping pressure on handles 41a and 41b of pliers 40, and correspondingly the grip of pliers 40 at jaws 42a and 42b is extremely tight. While such a wrap could be achieved without the use of slot 13, the presence of slot 13 does facilitate it and make the operation simpler. In FIG. 6, gripping strip 20 has been wrapped at least two times around the circumferential edge of the lid 51 of a jar 50. One generally continually applies tension on strip 20 as he performs the wrapping operation. The knotted end 21 is then slipped through slot 22 and gripping strip 20 is tightly in place on the peripheral edge of lid 51. Because of the tightened grip of strip 20 on lid 51, one can now grasp lid 51 with his hand and fingers on the outside of gripping strip 20 and rotate it, and lid 51 will readily loosen. Wrapping the gripping device 20 around a screwdriver handle would be a similar application.

Figure 7:
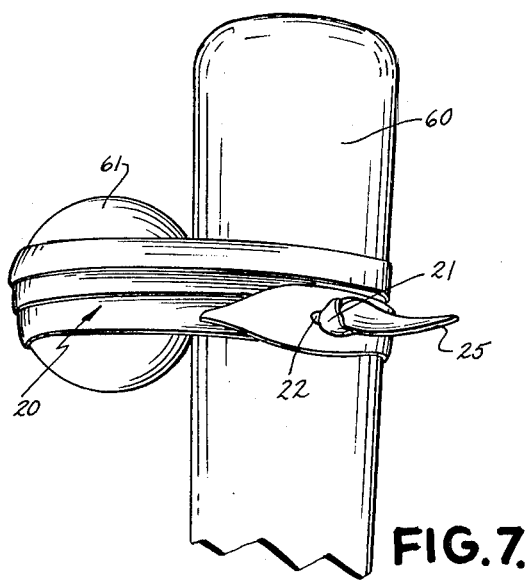
FIG. 7 shows the gripping device being used to secure a ball to a bat.

In FIG. 7, gripping strip 20 has been wrapped several times around a bat 60 and a ball 61 to positively hold the ball to the bat and prevent its being lost.

Figure 8:
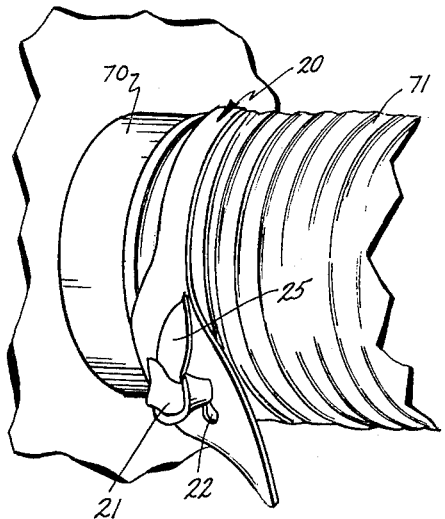
FIG. 8 shows the gripping device employed to clamp one conduit to another.

In FIG. 8, a flexible duct 71 has been clamped on a rigid exhaust duct 70 through the use of gripping strip 20. Flexible conduit 71 has been slipped over rigid conduit 70 and gripping strip 20 has been wrapped at least twice around the circumference of the end of flexible conduit 71, while the wrapper generally continually maintains tension on gripping strip 20. Knot 21 is then slipped through slot 22 and flexible conduit 71 is now tightly clamped to rigid conduit 70.

Figure 9:
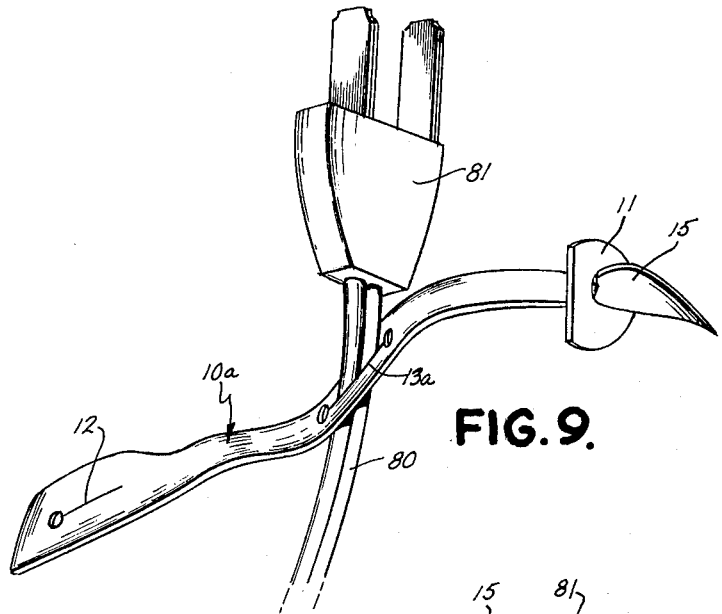
FIG. 9 shows the gripping device tied to a cord.
Figure 10:
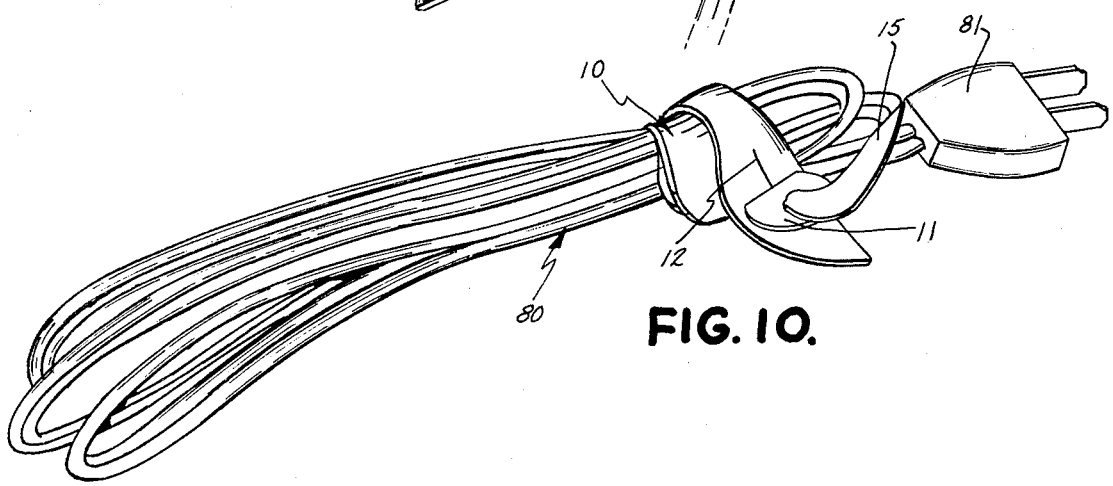
FIG. 10 shows the cord bundled and tightly wrapped within the gripping device.

In FIG. 9, a slightly shorter version 10a of gripping strip 10 has been fastened around an electrical cord 80 near the plug 81 thereof, by slipping slot 13a thereover. Cord 80 is bundled so that it lies in the vicinity of gripping strip 10a and gripping strip 10a is then wrapped a couple of times around the bundle as shown in FIG. 10. Button 11 is then slipped through slot 12. Cord 80 is now conveniently bundled and can be easily unbundled by pushing button 11 back out through slot 12 and unwinding gripping strip 10a. By fastening gripping strip 10a to cord 80, the gripping strip 10a will always be located where it is needed.

In all of the gripping methods described in connection with FIGS. 6 through 8, gripping strip 10 as described herein could have been used by simply disregarding and not using slot 13. Alternative embodiment strip 30 as described is probably not sufficiently strong for some of the above methods, but probably would be useful as a cord bundling device in accordance with the method of FIGS. 9 and 10. It would be more useful in many situations than ordinary rubber bands. By increasing the strength of gripping strip 30, either through materials or through increasing its dimensions, one could also render it useful in performing the methods described in FIGS. 6 through 8.

Because of the "gripping" nature of the invention, it can also be used to temporarily seal pipe leaks, wrap cardboard boxes and in other gripping applications.

Of course, it is understood that the above are merely preferred embodiments of the invention and that various changes, alterations and other uses of the invention can be made without departing from the spirit and broader aspects of the invention.

The embodiments of the invention in which an exclusive property or privilege is claimed are defined as follows:

1. A gripping device comprising: an elongated flat strip of flexible, elastic material having at least 100% elasticity and having two ends, there being an enlargement said strip located near one end thereof, and there being an aperture formed in the vicinity of the other end of said strip, said aperture being just sufficiently large that said enlargement can be fitted therethrough but being sufficiently small that once through said aperture, said enlargement cannot be easily pulled back through, whereby said strip can be wrapped around objects, easily stretched during wrapping so as to tighten there against, and then secured by slipping said enlargement through said aperture.

2. The device of claim 1 in which there is a second aperture spaced from said first aperture and located on said strip near said enlargement.

3. The device of claim 2 in which there is a gripping tab extending from said enlargement and defining the end of said strip.

4. The device of claim 3 in which said gripping tab tapers to a point so that the extreme end of said device is pointed.

5. The device of claim 4 in which each of said first and second apertures comprises a slot in and through the thickness of said strip, said slot having just sufficient length that it can be enlarged to allow said enlargement to be pushed therethrough, but said slot being significantly narrower than the dimensions of said enlargement such that once through said slot, said enlargement cannot be easily pulled back through.

6. The device of claim 5 in which said slot terminates at least at one end against which pressure would bear in usage of said device in a rounded hole whereby tension forces are distributed around said hole to minimize tearing of said slot during use of said gripping device.

7. The device of claim 6 in which said strip is wider at said first slot than the typical width of said strip throughout the rest of its length.

8. The device of claim 1 or 2 in which said enlargement comprises a button integrally molded with said strip and having a generally flat surface facing away from said one end of said strip.

9. The device of claim 1 or 2 in which said enlargement comprises a knot tied in said strip.

10. The device of claim 1 or 2 in which said enlargement comprises a member having an aperture therein which is slipped over said strip and having a generally flat surface facing away from said one end of said strip, there being a knot tied in said strip behind said member to prevent it from slipping off said one end of said strip.

11. The device of claim 1 or 2 in which said enlargement comprises a bead formed of metalized epoxy on and around said strip and said aperture comprises a loop at the other end of said strip, the base end of said loop being held closed by metalized epoxy.

12. The device of claims 1, 2, 3, 4, 5, 6, or 7 in which said strip has an elasticity of at least 250%.

13. The device of claim 1 in which said aperture comprises a slot in and through the thickness of said strip, said slot having just sufficient length that it can be enlarged to allow said enlargement to be pushed therethrough, but said slot being significantly narrower than the dimensions of said enlargement such that once through said slot, said enlargement cannot be easily pulled back through.

14. The device of claim 13 in which said slot terminates at least at one end against which pressure would bear in usage of said device in a rounded hole whereby tension forces are distributed around said hole to minimize tearing of said slot during use of said gripping device.

15. The device of claim 14 in which there is a gripping tab extending from said enlargement and defining the end of said strip.

16. The device of claim 15 in which said gripping tab tapers to a point so that the extreme end of said device is pointed.

17. The device of claim 13 in which said strip is wider at said first slot than the typical width of said strip throughout the rest of its length.

18. The device of claim 13, 14, 15, 16 or 17 in which said strip has an elasticity of at least 250%.

19. A method for gripping articles comprising wrapping an article with an elongated flat strip of flexible, elastic material having at least 100% elasticity and having two ends, there being an enlargement relative to the lateral cross-sectional dimensions of said strip located near one end thereof, and there being an aperture in said strip located near the other end thereof, said aperture being just sufficiently large that said enlargement can be fitted therethrough, but being sufficiently small that once through said aperture, said enlargement cannot easily be pulled back through it; applying tension to said strip as it is wrapped about said article by stretching the same at least 100%, and inserting said enlargement through said aperture to hold said strip in place.

20. The method of claim 19 in which said article is a gripping tool with two handles and gripping jaws, providing a second aperture in said strip spaced from said first aperture and located near said enlargement, locating said gripping tool such that its gripping jaws are over an object to be gripped, followed by slipping said second aperture over one of said handles of said gripping tool and wrapping said strip around both said handles of said gripping tool so as to draw them together, while applying said tension to said strip, followed by said step of inserting said enlargement through said first aperture.

21. The method of claim 20 in which said step of providing said strip with said first and second apertures comprises providing a slot in and through said strip at the location of each of said apertures.

22. The method of claim 21 in which said step of providing said strip with a slot in and through said strip includes providing a hole at that end of said slot which will be in stress during use of said gripping device whereby the tendency of said slot to tear will be minimized.

23. The method of claim 21 in which said step of providing said strip includes providing said strip with an enlarged width at the area in which said first slot is located, said width being greater than the typical width of said strip throughout the rest of its length.

24. The method of claim 19 in which said step of providing said strip with said aperture comprises providing a slot in and through said strip.

25. The method of claim 24 in which said step of providing said strip with a slot in and through said strip includes providing a hole at that end of said slot which will be in stress during use of said gripping device whereby the tendency of said slot to tear will be minimized.

26. The method of claim 19 in which said object to be gripped is a cord bundle, said method comprising fastening said strip onto said cord, followed by bundling said cord so that said bundle lies adjacent said strip, followed by wrapping said strip in the manner set forth in claim 19 and inserting said enlargement through said aperture in the manner described in claim 19.

27. The method of claim 19 in which said step of providing said strip includes providing said strip with a gripping tab projecting from said enlargement and defining said one end thereof.

28. The method of claim 27 which includes providing a point on said gripping tab, said point defining the extremity of said strip.

29. A method for tightening the grip of a gripping tool with two handles and gripping jaws, said method comprising: providing an elongated flat strip having at least 100% elasticity and having two ends with a first aperture at one end and a second aperture in said strip spaced from said first aperture and located near said other end of said strip, locating said gripping tool such that its gripping jaws are over an object to be gripped, followed by slipping said second aperture over one of said handles of said gripping tool and wrapping said strip around both said handles of said gripping tool by stretching the same at least 100% so as to draw them together, while applying tension to said strip, followed by slipping said first aperture over the other of said handles of said gripping tool.

30. The method of claim 29 in which said step of providing said strip with said first and second apertures comprises providing a slot in and through said strip at the location of each of said apertures.

31. The method of claim 30 in which said step of providing said strip with a slot in and through said strip includes providing a hole at that end of said slot which will be in stress during use of said gripping device whereby the tendency of said slot to tear will be minimized.

32. The method of claim 30 in which said step of providing said strip includes providing said strip with an enlarged width at the area in which said first slot is located, said width being greater than the typical width of said strip throughout the rest of its length.

33. The method of claim 19, 20, 29, 23, 24, 25, 26, 27, 28, or 32 in which said step of providing said strip comprises providing a strip having at least 250% elasticity.

* * * * *

UNITED STATES PATENT AND TRADEMARK OFFICE
CERTIFICATE OF CORRECTION

PATENT NO. : 4,229,924
DATED : October 28, 1980
INVENTOR(S) : Donald O. Teachout, Sr.

It is certified that error appears in the above—identified patent and that said Letters Patent is hereby corrected as shown below:

Column 5, lines 10 & 11:

after "enlargement" should be --relative to the lateral cross-sectional dimensions of--

Signed and Sealed this

Thirtieth Day of June 1981

[SEAL]

Attest:

RENE D. TEGTMEYER

*Attesting Officer*   *Acting Commissioner of Patents and Trademarks*